Figure 4:
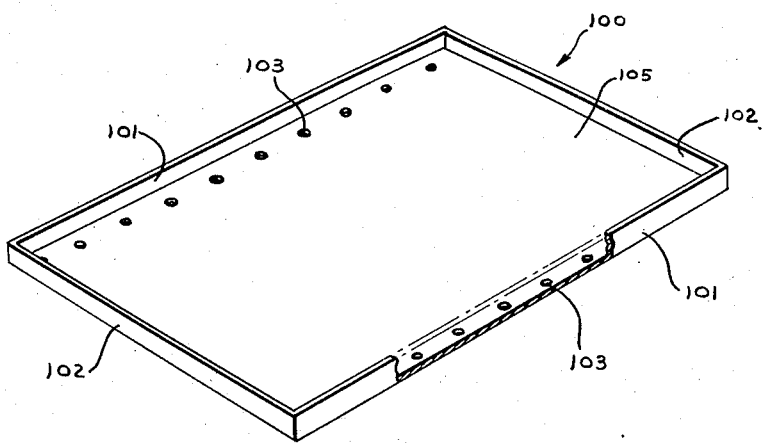

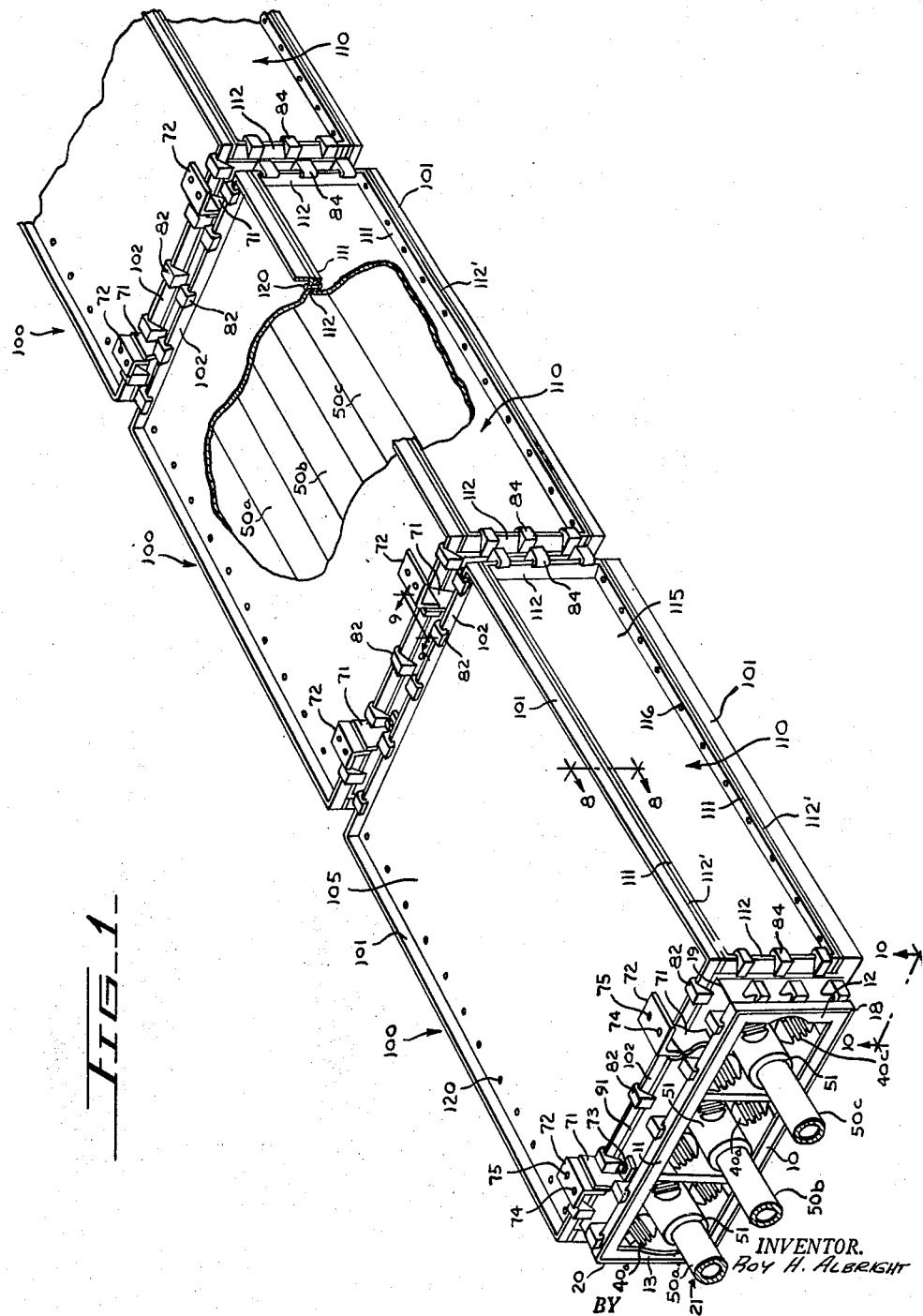

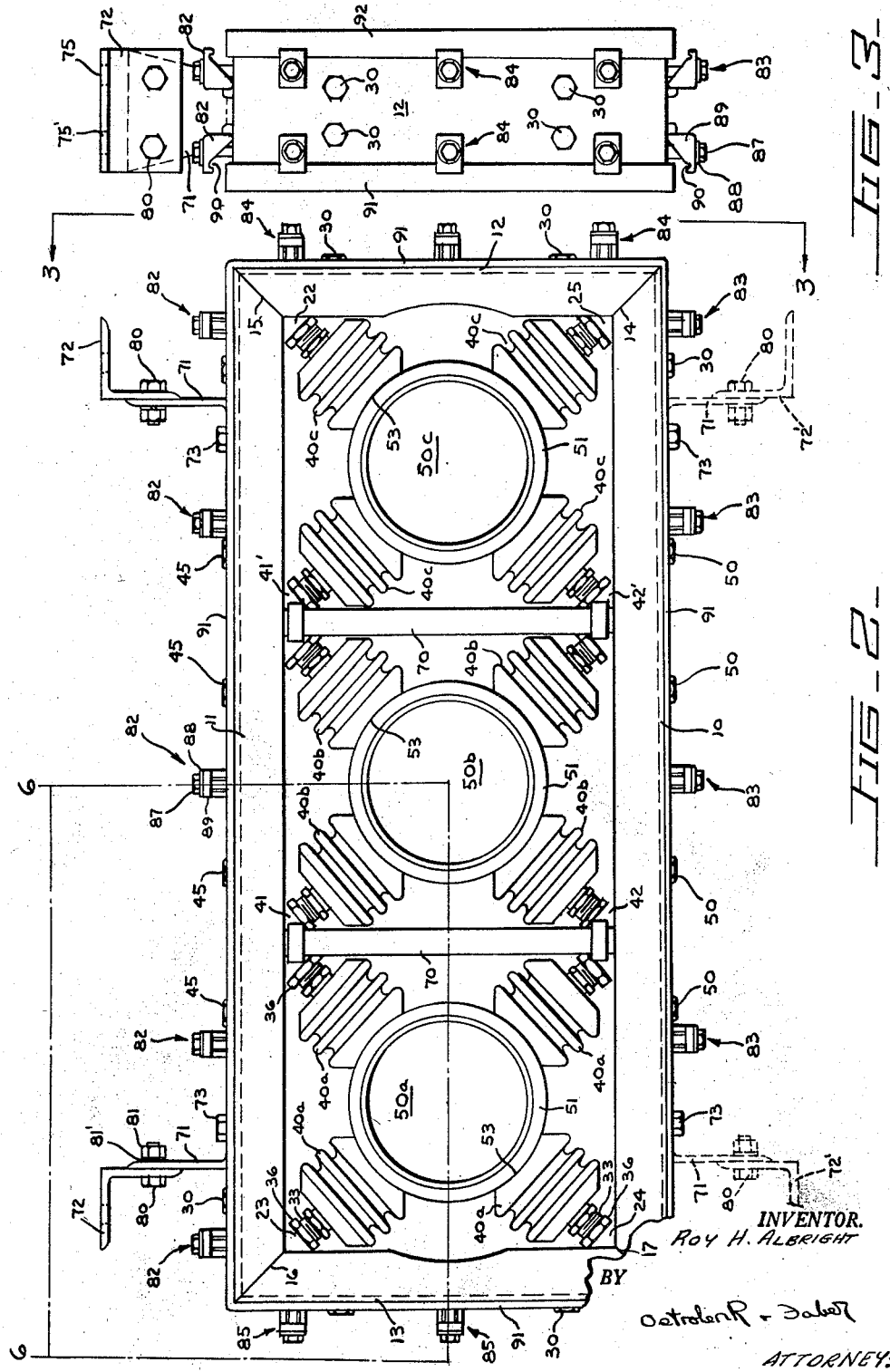

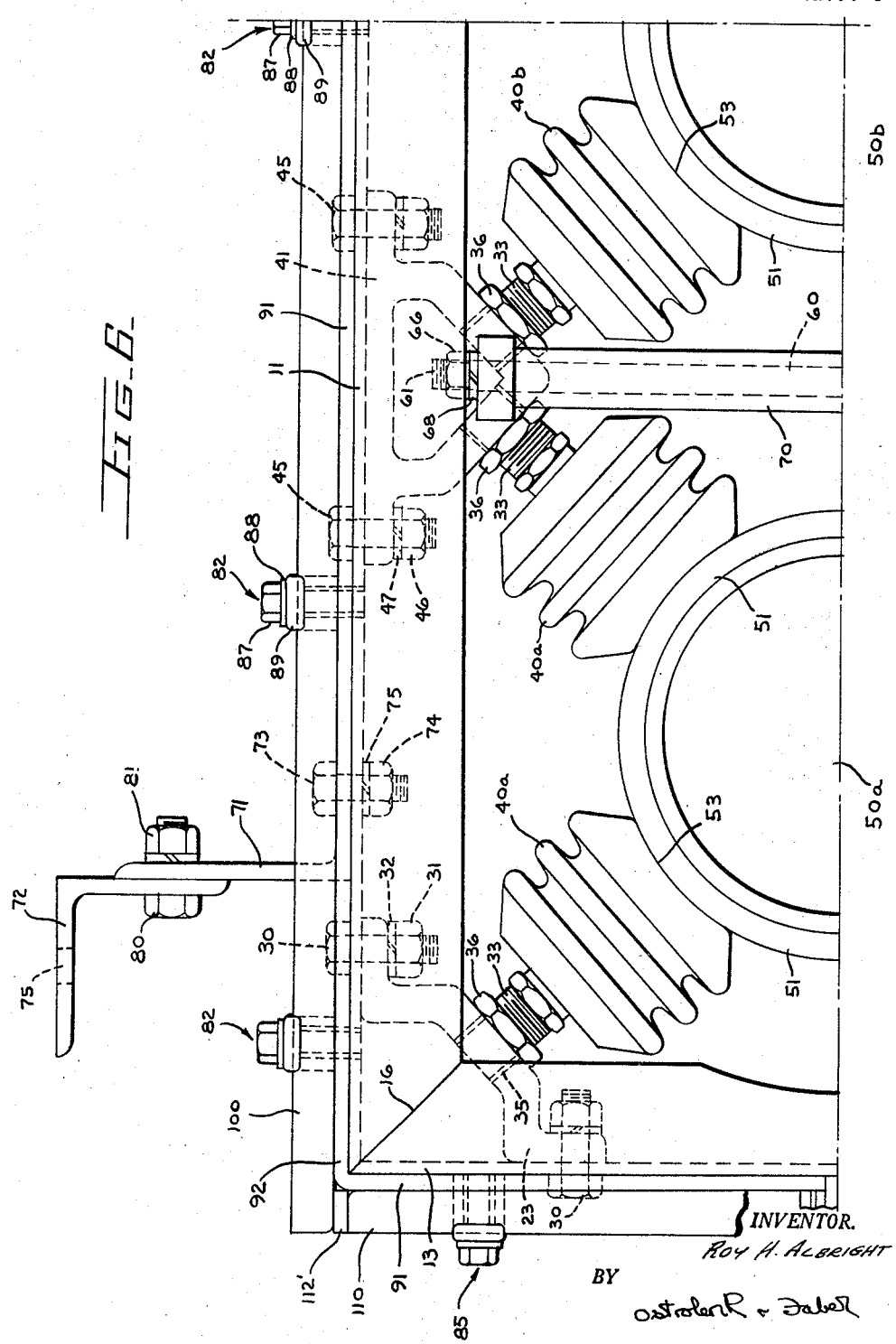

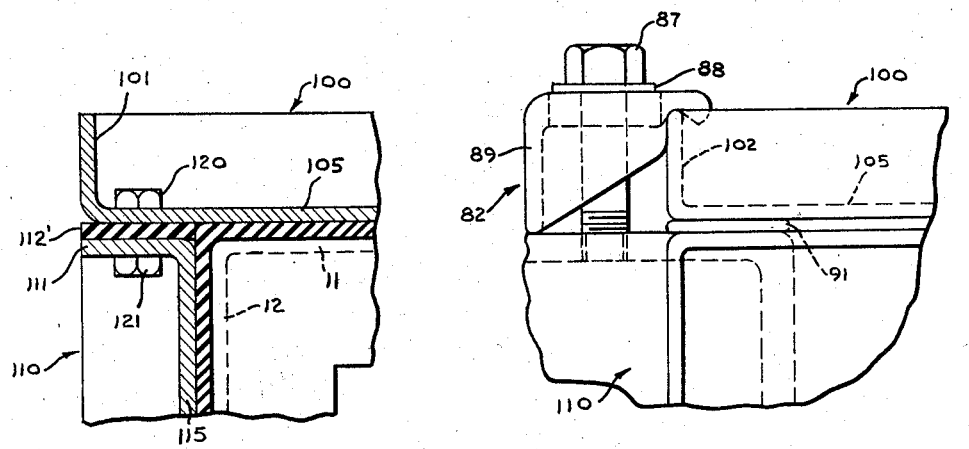
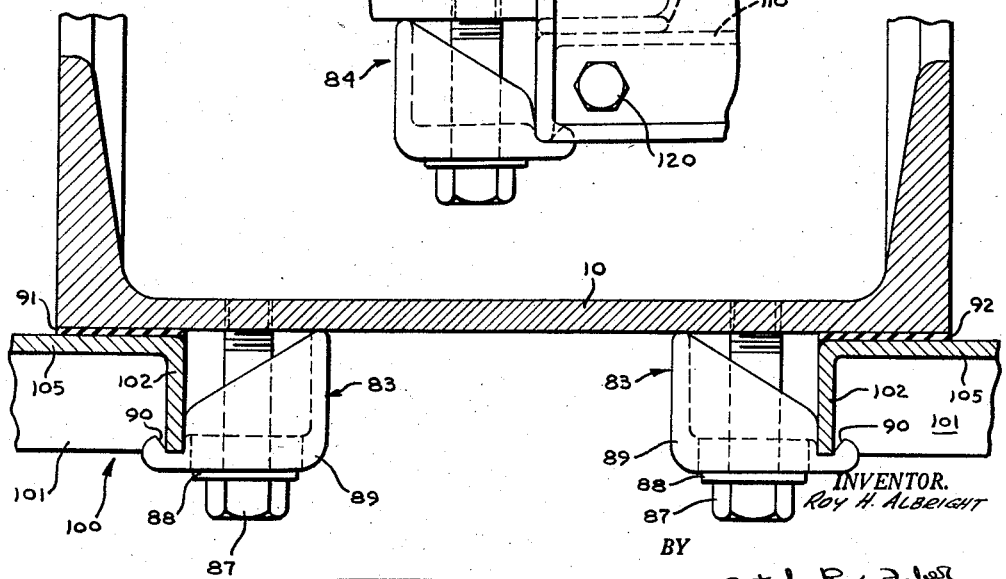

United States Patent Office 2,851,514
Patented Sept. 9, 1958

2,851,514
NON-SEGREGATED PHASE BUS STRUCTURE

Roy H. Albright, Greensburg, Pa., assignor, by mesne assignments, to I-T-E Circuit Breaker Company, Philadelphia, Pa., a corporation of Pennsylvania Application October 20, 1952, Serial No. 315,779

6 Claims. (Cl. 174—99)

My invention relates to metal enclosed bus structures and is more particularly related to non-segregated phase bus structures supported and enclosed in rectangular frame enclosures.

In the novel structural arrangement of my invention the pan shaped covers, forming the housing of the bus structure, are fastened in a manner so that they are sufficiently flexible to allow for expansion, contraction and slight misalignment.

In addition to providing for these variations, the method of fastening and structural arrangement permits the bus structure to be dust proof.

My novel arrangement does not have interphase barriers due to the space limitation and thus, the conductors may be covered with an insulation in order to keep the housing dimensions to a minimum. However, if adequate space is available for the housing, the conductors or buses may be bare even though no interphase barrier is provided.

The three conductors or buses are individually supported in a rectangular frame by means of radially disposed insulators. The frames in turn may be at intervals along the bus run and are mounted by means of mounting angles on a built-in structure or super structure in either a suspended or upright position.

The plurality of frames, used to support the three conductors or buses, may be stiffened by means of tie rods connected to opposite sides of the frame support. These tie rods may be insulated if it is desirable to reduce the dimensions of the frame.

Separate pan shaped covers are provided for each side of the rectangular bus structure being folded together along their longitudinal edges and secured to the rectangular frames by means of clamping units secured to the frames along their transverse edges.

Sponge rubber gaskets are placed at all clamp and bolted connections. Hence, this novel arrangement of bolting and clamping combined with the arrangement whereby the complete assembly is gasketed, permits three advantages which are not usually obtained in rectangular bus structures. For example, as above noted, (1) the clamping of the covers to the rectangular frames permits movement thereof due to expansion and contraction of the bus enclosure; (2) this novel arrangement of clamping the rectangular closure to the rectangular frame permits compensation for misalignment of the built-in structures, terminating structures etc., and (3) the positioning of gaskets at all bolted or clamping connections provides for a dust proof enclosure.

Thus, in my novel structural arrangement, the covers are positioned between adjacent rectangular frames and are made in four sections, one for each side of the frame with each cover having a pan shaped design.

The transverse edges or ends of the covers are clamped to the rectangular frame and the longitudinal edges or sides parallel to the conductors are bolted together between frames with sponge rubber gaskets used at all clamped or bolted connections.

My novel non-segregated phase bus structure lends itself to use with either round, square or other conductor arrangements which may or may not be covered with insulation as above noted.

In a preferred embodiment of my invention, four insulators are used to support each phase, tube or conductor. With this arrangement, the insulators rock on the spherical surfaces of the threaded adjusting studs and short circuiting stresses will result in compression loadings of the insulators.

In a second modification of my invention, three insulators may be used with the same type of insulator and stress thereon, as noted in connection with the embodiment utilizing four insulators.

A second embodiment of my invention provides a bus structure wherein one or two cantilever type insulators having slip type clamps may be used to support the conductors.

With this second modification, the short circuit stress on the bus structure will result in cantilever loading of the insulators.

Accordingly, a primary object of my invention is to provide a non-segregated phase bus structure having rectangular frame enclosures wherein the closures thereof are clamped to the frame to permit movement due to the expansion and contraction of the bus enclosure.

Another object of my invention is to provide a novel mounting means for the housing of conductors which permits expansion and contraction of the bus enclosure without buckling the unit.

Still another object of my invention is to provide a housing and attachment means therefor for a bus structure which can be readily and easily installed in spite of misalignment of built-in structure, terminal equipment, etc.

A further object of my invention is to provide a metal enclosed bus structure having gasket means at all bolted or clamped connections.

Another object of my invention is to provide a non-segregated phase bus structure which has a dust proof enclosure.

A further object of my invention is to provide a clamping means to attach closures to the frame which will permit compensation for misalignment.

A still further object of my invention is to provide a novel non-segregated phase bus structure having no interphase barriers wherein the frames are stiffened by means of tight rods.

Still another object of my invention is to provide a novel enclosure means whereby four pan shaped covers are provided for clamping attachments to the side of the rectangular frames.

These and other objects of my invention will be apparent from the following description when taken in connection with the drawings, in which:

Figure 1 is a fragmentary perspective view showing the mounting of the conductors within the rectangular frame, the novel clamping of the pan shaped covers and the gaskets positioned between all clamped and bolted connections.

Figure 2 is an end view of the rectangular frame used in my novel bus run. This figure shows the first embodiment of my invention wherein each conductor is supported by four insulators. Each of the insulators rock on the spherical surfaces of the threaded adjusting studs and are under compression loading when short circuiting stresses are set up. The plurality of anchor castings, and their attachment to the frame, for support of the insulators is also shown. This figure further illustrates the positioning of the clamping means for the covers and the tight rods used to stiffen and support the rectangular frame. As will be noted, the frame is adapted to have mounting angles connected to either its upper or lower end depending on whether it is more convenient to suspend or support the frame in an upright position.

Figure 3 is a view taken along the line 3—3 of Figure 2. This drawing illustrates the relative position of the clamps used to secure the covers to the frame.

Figure 4 is a perspective view of the cover which is used for the top and bottom sides of the bus structure. As seen in this figure, these covers may be assembled without gaskets and have a plurality of bolts on the main surface thereof to permit proper attachment to the side covers. The lip edges running perpendicular to the conductors provide a surface to which the clamps of the frames may be attached for securing the cover thereto.

Figure 5:
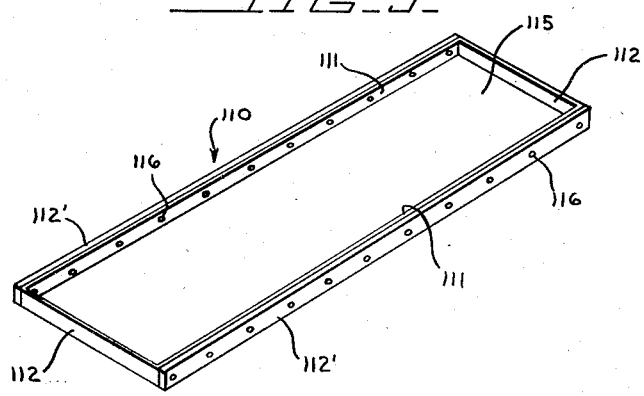

Figure 5 is a perspective view of the pan shaped covers used on the two sides of my novel bus structure. These covers have sponge rubber gaskets secured to the longitudinal lip thereof in order to provide a dust proof arrangement along the bolted edges. A plurality of holes are provided in the longitudinal lips to which the gaskets are attached on the outer surface to receive bolts for attachment to the upper and lower covers of Figure 4.

Figure 6 is a view of the section enclosed in dotted lines of Figure 2 and further shows the covers attached to the frame with a gasket positioned at the bolted connection. This enlarged view illustrates the construction of the anchor castings used in the corners, top and bottom of the rectangular frame and the attachment of the threaded adjusting studs thereto.

Figure 7 is a partial end view of the rectangular frame, similar to the lower portion of Figure 3, and illustrates the clamping connection between the frame and the transverse lip of the bottom covers extending from the left to the right of the frame. This figure further illustrates the positioning of the gasket means of the rectangular frame member in order to insure a dust proof assembly at the clamping connection.

Figure 8 is a partial view taken along the line 8—8 of Figure 1 looking in the direction of the arrows and illustrates the bolted connection between the covers on the top and side of the enclosure and the longitudinal gasket positioned therebetween.

Figure 9 is a partial view taken along the line 9—9 of Figure 1 looking in the direction of the arrows. This figure illustrates both the clamping connection of the frame to the top cover along its transverse lip and also the bolted connection between the side and top cover along their longitudinal sides. This figure further illustrates the gasket means positioned along the longitudinal bolted connection to make this area dust tight. It will be noted that the longitudinal gasket illustrated in Figure 9 is the same as the gasket illustrated in Figure 8.

Figure 10 is a view taken along the line 10—10 of Figure 1 looking in the direction of the arrows. This view illustrates the clamping of the transverse side of both the side and bottom cover to the rectangular frame.

Referring now to Figure 2, the rectangular frame is made from four U-shaped members, U-shaped members 10 and 11 forming the top and bottom portions and U-shaped members 12 and 13 forming the side sections of the U-shaped rectangular member. These four sections 10, 11, 12 and 13 may be connected in any suitable manner at their bevelled edges 14, 15, 16 and 17 and external edges 18, 19, 20 and 21 (not shown) for example by welding. External edge 21 is located at the juncture between sections 10 and 13.

W-shaped angle brackets 22—23—24—25 etc., are secured to the frame 10, 11, 12 and 13 by means of bolt 30, nut 31 and steel lock washers 32. Studs 33 are threadably engaged in the threaded opening 35 of the W-shaped angle castings 22—23—24—25. Each adjustment stud 33 is provided with a lock nut 36 to prevent its relative movement with respect to the W-shaped angle castings 22—23—24—25. The opposite end of the adjusting studs 33 has a spherical surface which rides in a corresponding area on the supporting insulators 40 in a well known manner.

Two V-shaped angle castings 41—41' are permanently secured to the upper channel plane 11 by means of bolts 45, nuts 46 and steel lock washers 47. A similar pair of V-shaped angle castings 42—42' are positioned diametrically opposite members 41—41' and permanently secured to the bottom channel member 10 by means of bolts 50, which are retained by nuts and lock washers similar to nuts 46 and washers 47.

It will be noted that the adjusting studs 33 and their associated lock nuts 36 are secured to the angle castings 41—41' and 42—42' in substantially the same manner as heretofore described in connection with W-shaped angle castings 22—23—24—25. Enlarged sectional views of the W-shaped angle bracket 23 and V-shaped bracket 41 are seen in Figure 6.

Four supporting insulators 40a are provided for conductor 50a of the first phase, four supporting insulators 40b are provided for the conductor 50b of the second phase and four supporting insulators 40c are provided for the conductor 50c of the third phase.

The conductors 50a, 50b, 50c may be provided with or without insulation 51 secured to its outer surface. That is, the conductors 50a, 50b, 50c may be mounted on the insulators 40 bare if adequate space is available for the housing or they may be covered with insulation 51 when it is necessary that the housing dimensions be kept to a minimum.

The conductors 50a, 50b, 50c are supported in the rim shaped concaves 53 of the insulators in a well known manner to thereby permit rocking movement of the insulators due to the expansion or contraction of the conductors 50a, 50b, 50c.

The supporting frame comprising the channel members 10, 11, 12 and 13 may be provided with tie rods 60 in order to stiffen and strengthen the top and bottom sections 10 and 11 of the frame.

The tie rods 60 are threaded at their ends 61 and are positioned through appropriate openings of the V-shaped angle castings 41 and 42.

Hexagonal nuts 66 with lock washers 68 rigidly secure the tie rods 60 between the V-shaped angle castings 41 and 42.

It will be noted that the tie rods or spacers 60 may be provided with a hollow cylindrical insulator 70, positioned concentrically therewith, if it is desirable to reduce the size of the housing and still maintain adequate insulation. Thus as seen in Figure 2, there are two insulators 70 in this side view, and each one is concentric with a tie rod 60 such as illustrated in the enlarged view of Figure 6.

Mounting angles 71 may be secured to the top cover 11 by means of bolts 73, nuts 74 and lock washers 75 and companion mounting brackets 72 with appropriate openings 75' and 75 may be secured thereto by means of bolts 80, nuts 81 and lock washers 81'.

Thus, the entire frame, comprising channel members 10, 11, 12 and 13 may be suspended from a built-in structure by attaching the angle bracket 72 and 72' in any appropriate manner.

It will be apparent that the angle brackets 71 and 72 can be secured to the channel member 10, as indicated by the dotted lines, if it is desirable to mount the frame in a supported position.

Ten clamping members 82 are threadably secured to the top channel member 11, ten clamping members 83 are threadably secured to the bottom channel member 10, six clamping members 84 threadably secured to the side channel member 12 and six clamping members 85 are threadably secured to the side channel member 13. The number of clamping members to be used on the frame will vary with the size of the housing.

It will be noted that all of the clamping members 82—83—84—85 have identical construction and are secured to their respective channel members in the same manner. For example, each has a threaded bolt 87 which is threadably engaged with an appropriate threaded hole in its respective channel member and is provided with a steel flat washer 88 sandwiched between the bolt 87 and the clamping lock 89.

The clamping lock 89 is provided with a hook formed end 90 in order to enable it to be releasably secured to the transverse lips of the pan shaped covers, as will hereinafter be more fully described.

Two sponge rubber gaskets 91 and 92 having a rectangular cross-section and being made of a continuous strip are positioned at both ends of the opposite frame 10—11—12—13 as best seen in Figures 2 and 3. These two gaskets 91 and 92 are provided to insure a dust proof assembly at the points of clamping connection.

The covers to be attached to the opposite frames 10—11—12—13 are illustrated in the perspective views of Figures 4 and 5.

Figure 4 illustrates the pan shaped cover 100 which will be attached to the top and bottom of the bus structure. This cover 100 has all of its edges bent upwardly to form lips and the corners thereof are welded together to thereby form the pan shaped cover 100.

The lips 101 form the edges which, when the cover is clamped to the frames 10—11—12—13, will be longitudinal or parallel to the conductors, 50a, 50b, 50c and the lips 102 forming surfaces which will be transverse or perpendicular to the conductors 50.

A plurality of holes 103 are punched in the main flat section 105 of the cover 100 to receive bolts which will enable its connection to the side cover plates, which will hereinafter be described.

It will be noted that even though the entire bus structure is provided with gasket means at all the clamping and bolted connections, it is not necessary to provide the upper and lower covers 100 with a gasket.

Figure 5 illustrates the covers to be used for the sides of the bus structure. This cover 110 is similar to the top and bottom covers 100 and is formed with longitudinal lips 111 and transverse lips 112 by bending up the edges of the flat portion 115. Lips 111 and 112 are joined at the corners thereof as by welding. However, the covers to be used for the sides of the bus structure are provided with sponge rubber gaskets 112' which are permanently cemented to the longitudinal lips 111 by means of a "Bostik" cement which is manufactured by the B. B. Chemical Company.

After the sponge rubber gaskets 112 are cemented to the longitudinal lips 111, a plurality of holes 116 are punched in the lips in order to receive bolts which will pass through the holes 103 of the cover 100 so that the side plates may be connected to the top and bottom plates. Thus, it will be noted that the sponge rubber gaskets 112' will provide a dust proof seal at the bolted connections between the covers.

Figure 1 and particularly Figure 7 illustrates the manner in which the covers 101 are clamped to the channel member 10 of the frame unit 10—11—12—13.

As heretofore described, the channel member 10 is provided with a plurality of clamping members 83 and located opposite the hook end 90 thereof are sponge rubber gaskets 91 and 92 which are cemented to the channel members.

The covers 101 are positioned on adjacent edges of consecutive frame members (as seen in Figure 1) so that the flat portion 105 adjacent the transverse lip 102 is seated on the gaskets 91 or 92, as seen in Figure 7.

After the cover plates have been bolted to their adjacent covers, as hereinafter described, they are clamped to the frame member 10—11—12—13 by rotating the bolt 87 toward its associated channel member to thereby urge the hook 90 of the clamping lock 89 over its transverse lip 102.

When the bolt 87 is tightened, the seal lock washer 88 will insure that the cover plates are positively secured to the frame member.

It will be noted that the clamping of the side plates 110 and the top plates 100 is identical to that shown in enlarged Figure 7 which illustrates a clamping connection for the bottom covers 101. That is, as seen in Figure 1, all of the covers are secured to the frame 10—11—12—13 by means of clamping members 82—83—84 along their transverse lips in substantially the same manner as shown in Figure 7.

As seen in Figure 1 and more particularly in Figure 8, the top cover 100 is secured to the side cover 110 by means of bolts 120 which pass through holes 103 and the flat portion 105 of the top cover 100 and the holes 116 in the gasket 112' and longitudinal lip 111 of the cover 110. After the bolts 120 are passed therethrough, the nuts 121 are attached thereto and securely tightened. Thus, after the top plate is secured properly to the side plate, it will be noted that the sponge rubber gasket forms a dust proof seal along the bolted connection of these covers.

It will be noted that the top cover 100 is secured to both side plates 110 and the bottom cover 100 in like manner is secured to both side plates in the identical manner as set forth in Figure 8.

Figures 9 and 10 taken along the lines 9—9 and 10—10 respectively of Figure 1 illustrate the connection of the clamping means 82—84—85 to the covers 100, 100 and 110 respectively and further illustrate the position of the gasket at the bolted and clamped connections, as shown in the overall view of Figure 1.

In summary, I have provided a novel non-segregated phase bus structure having a rectangular housing which is made in four separate independent covers which are bolted together along their longitudinal ends and clamped to the rectangular frame along their transverse lips.

By providing clamping means, threadably secured to the frame members, to engage the transverse lips of the covers on the four sides of the bus structure, I have provided a structure which permits movement of the unit due to expansion and contraction and thereby prevents any possibility of damage due to buckling or excess strain on the material.

Furthermore, this novel method of attaching the covers to the frame member by means of a plurality of clamping devices permits proper compensation for misalignment of built-in structures, terminal equipment, etc.

Furthermore, by providing a novel arrangement, it is possible to position two continuous sponge rubber gaskets on opposite edges of each frame and two rectangular sponge rubber gaskets on the longitudinal lips of each side plate, it is possible to obtain a bus structure having gaskets at all bolted or clamped connections to insure a dust proof enclosure.

Furthermore, this novel construction lends itself to the use of four supporting insulators which will be under compression loading due to short circuiting stresses and it will be apparent that the structural arrangement could be used with one or two cantilevered support insulators with slip type clamps around the conductors so that the insulators are under cantilevered loading during short circuit stresses.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a non-segregated phase bus structure having a rectangular shape comprising a plurality of conductors, a plurality of insulators, a plurality of frames and a plurality of covers, said plurality of conductors supported by said plurality of insulators, said plurality of insulators supported by said frames, each of said frames comprising four U-shaped members assembled to form a rectangular shape, a plurality of clamping means including members having hooked ends threadably secured externally of said frame to each long side of each of said four U-shaped members, each of said plurality of covers having a shallow elongated rectangular pan shaped configuration with two transverse lips and two longitudinal lips, each of said covers supported on one long side of its associated U-shaped member adjacent said plurality of clamping means, said covers secured to said U-shaped members by means of the hooked ends of said plurality of clamping means engaging said transverse lip to permit movement due to expansion and contraction and to compensate for misalignment, said covers secured to each other along their longitudinal edges by means of bolts, nuts and steel lock washers, a gasket located at each bolted and clamped connection to provide a dust proof enclosure.

2. In a non-segregated phase bus structure having a rectangular shape comprising a plurality of conductors, a plurality of insulators, a plurality of frames and a plurality of covers, said plurality of conductors supported by said plurality of insulators, said plurality of insulators supported by said frames, each of said frames comprising four U-shaped members assembled to form a rectangular shape, a tie rod connected between opposite U-shaped members of said frame to strengthen and stiffen said frame, a plurality of clamping means including members having hooked ends threadably secured externally of said frame to each long side of each of said four U-shaped members, each of said plurality of covers having a shallow elongated rectangular pan shaped configuration with two transverse lips and two longitudinal lips, each of said covers supported on one long side of its associated U-shaped member adjacent said plurality of clamping means, said covers secured to said U-shaped members by means of the hooked ends of said plurality of clamping means engaging said transverse lip to permit movement due to expansion and contraction and to compensate for misalignment, said pan-shaped covers to be used on the sides of said frame having a gasket cemented to the longitudinal lip thereof and holes punched through said gasket and said longitudinal lip, said covers to be used on the top and bottom of said frame having a plurality of holes punched along the surface adjacent said longitudinal lip, said side covers secured to said top and bottom covers by means of bolts passed through said plurality of holes; each of said transverse lips and said longitudinal lips of one of said covers projecting in diverging directions from the transverse and longitudinal lips of the other said covers.

3. In a non-segregated phase bus structure having a rectangular shape comprising a plurality of conductors, a plurality of insulators, a plurality of frames and a plurality of covers, said plurality of conductors supported by said plurality of insulators, said plurality of insulators supported by said frames, each of said frames comprising four U-shaped members assembled to form a rectangular shape, a plurality of clamping means including members having hooked ends threadably secured externally of said frame to each long side of each of said four U-shaped members, each of said plurality of covers having a shallow elongated rectangular pan shaped configuration with two transverse lips and two longitudinal lips, each of said covers being supported on one long side of its associated U-shaped member adjacent said plurality of clamping means, said covers secured to said U-shaped members by means of the hooked ends of said plurality of clamping means engaging said transverse lip to permit movement due to expansion and contraction and to compensate for misalignment, said pan-shaped covers to be used on the sides of said frame having a gasket cemented to the longitudinal lip thereof and holes punched through said gasket and said longitudinal lip, said covers to be used on the top and bottom of said frame having a plurality of holes punched along the surface adjacent said longitudinal lip, said side covers secured to said top and bottom covers by means of bolts passed through said plurality of holes, a gasket positioned between said covers and said frame at a point adjacent said clamping means, said last mentioned gasket and said first mentioned gasket secured to the lips of said side covers providing a dust proof enclosure for said bus structure.

4. In a bus structure having a rectangular shape comprising a conductor, a plurality of insulators, a frame and a cover means, said conductor supported by said plurality of insulators, said plurality of insulators supported by said frame, said frame comprising a plurality of U-shaped members assembled to form a rectangular shape positioned in a plane perpendicular to said conductor with the arms of said U-shaped members projecting toward the inside of said rectangular shape, clamping means, including members having hooked ends, threadably secured to each long side of said U-shaped members externally of said rectangular shape said cover means comprising an individual cover, for each of said U-shaped members having a shallow elongated rectangular pan shaped configuration with two transverse lips and two longitudinal lips, each of said covers being supported on an outer surface of said frame along one long edge of its associated U-shaped member adjacent said clamping means, said covers secured to said U-shaped members by means of the hooked ends of said clamping means engaging said transverse lips to permit movement due to expansion and contraction and to compensate for misalignment, said covers secured to each other along their longitudinal edges by means of bolts, nuts and steel lock washers, and a gasket located at each bolted and clamped connection to provide a dust proof enclosure.

5. In a bus structure comprising a conductor, an insulator, a frame and a cover means, said conductor supported by said insulator, said insulator supported by said frame, said frame comprising U-shaped members assembled to form a rectangular shape, a tie rod connected between opposite U-shaped members of said frame to strengthen and stiffen said frame, clamping means, including members having hooked ends, threadably secured to each end of each of said U-shaped members externally of said rectangular shape said cover means comprising an individual cover, for each of said U-shaped members having a shallow elongated rectangular pan shaped configuration with two transverse lips and two longitudinal lips, each of said covers being supported on an outer surface of said frame along one long edge of its associated U-shaped member adjacent said clamping means, said covers secured to said U-shaped members by means of the hooked ends of said clamping means engaging said transverse lips to permit movement due to expansion and contraction and to compensate for misalignment, said pan shaped covers to be used on the sides of said frame having a gasket cemented to the longitudinal lip thereof and holes punched through said gasket and said longitudinal lip, said covers to be used on the top and bottom of said frame having a plurality of holes punched along the surface adjacent said longitudinal lip, said covers to be used on the sides of said frame secured to said top and bottom covers by means of bolts passed through said plurality of holes.

6. In a bus arrangement comprising a conductor, an insulator, a frame and a plurality of covers, said conductor supported by said insulator, said insulator supported by said frame, said frame comprising U-shaped members assembled to form a rectangular shape, clamping means, including members having hooked ends, secured to each long side of said U-shaped members externally of said frame, each of said covers having a shallow elongated rectangular pan shaped configuration with two transverse lips and two longitudinal lips, each of said covers being supported on an outer surface of said frame along one long edge of its associated U-shaped member adjacent said clamping means, said covers secured to said U-shaped members by means of the hooked ends of said clamping means engaging said transverse lips to permit movement due to expansion and contraction and to compensate for misalignment, said pan-shaped covers to be used on the sides of said frame having a gasket cemented to the longitudinal lips thereof and holes punched through said gasket and said longitudinal lip, said covers to be used on the top and bottom of said frame having a plurality of holes punched along the surface adjacent said longitudinal lip, said side covers secured to said top and bottom covers by means of bolts passed through said plurality of holes, a gasket positioned between said covers and said frame at a point adjacent said clamping means, said last mentioned gasket and said first mentioned gasket secured to the lips of said side covers providing a dust proof enclosure for said bus arrangement.

References Cited in the file of this patent

UNITED STATES PATENTS

| | | |
|---|---|---|
| 400,262 | Smith | Mar. 26, 1889 |
| 1,992,574 | Jenkins | Feb. 26, 1935 |
| 2,122,298 | Scott | June 28, 1938 |
| 2,181,664 | Melzer | Nov. 28, 1939 |
| 2,223,300 | Bellis | Nov. 26, 1940 |
| 2,306,353 | Cole | Dec. 22, 1942 |
| 2,353,121 | Adams et al. | July 11, 1944 |
| 2,356,006 | Samer | Aug. 15, 1944 |
| 2,735,964 | Grieve et al. | Feb. 21, 1956 |